United States Patent [19]

Chattopadhyay

[11] Patent Number: 4,919,179
[45] Date of Patent: Apr. 24, 1990

[54] WATER-IN-OIL EMULSION EXPLOSIVE

[75] Inventor: Arun K. Chattopadhyay, McMasterville, Canada

[73] Assignee: Imperial Chemical Industries PLC, London, England

[21] Appl. No.: 392,367

[22] Filed: Aug. 11, 1989

[30] Foreign Application Priority Data

Sep. 21, 1988 [GB] United Kingdom ............... 8822187

[51] Int. Cl.$^5$ ................................. C06G 45/00
[52] U.S. Cl. .............................. 149/2; 149/21; 149/60; 149/61
[58] Field of Search ................. 149/2, 21, 60, 61

[56] References Cited

U.S. PATENT DOCUMENTS

| | | | |
|---|---|---|---|
| 4,357,184 | 11/1982 | Binet et al. | 149/2 |
| 4,708,753 | 11/1987 | Forsberg | 149/2 |
| 4,710,248 | 12/1987 | Yates et al. | 149/2 |
| 4,764,230 | 8/1988 | Bates et al. | 149/2 |
| 4,820,361 | 4/1989 | McKenzie et al. | 149/2 |
| 4,822,433 | 4/1989 | Cooper et al. | 149/2 |
| 4,828,633 | 5/1989 | Forsberg | 149/2 |
| 4,840,687 | 6/1989 | Forsberg et al. | 149/2 |
| 4,844,756 | 7/1989 | Forsberg | 149/2 |

Primary Examiner—Stephen J. Lechert, Jr.
Attorney, Agent, or Firm—Cushman, Darby & Cushman

[57] ABSTRACT

A novel PIBSA-based surfactant is provided which has particular utility in the manufacture of water-in-oil explosive emulsions. The surfactant comprises the esterification product of polyalk(en)yl succinic anhydride and an adduct of the formula:

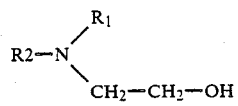

where $R_1$ is H or $-CH_2-CH_2-OH$ and $R_2$ is selected from the group consisting of an acyl group containing 8-20 carbon atoms and a hydroxy ethyl ester of a mono- or di-carboxylic acid containing from 8-25 carbon atoms. The compound can be distinguished from the prior art PIBSA-based surfactants by virtue of the absence of any polyamine in its synthesis, the presence of an ester linkage and the absence of a salt linkage.

7 Claims, No Drawings

WATER-IN-OIL EMULSION EXPLOSIVE

TECHNICAL FIELD

This invention relates to water-in-oil emulsions and, more particularly, to water-in-oil emulsion explosives containing a surfactant which is a derivatized polyalk(en)yl species.

BACKGROUND OF THE INVENTION

Water-in-oil emulsion explosives are now well known in the explosives art. Bluhm, in U.S. Patent No. 3,447,978, disclosed a composition comprising an aqueous discontinuous phase containing dissolved Oxygen-supplying salts, a carbonaceous fuel continuous phase, an occluded gas and a water-in-oil emulsifier. Cattermole et al, in U.S. Pat. No. 3,674,578, describe a similar composition containing as part of the inorganic oxidizer phase, nitrogen-base salt such as an amine nitrate. Tomic, in U.S. Pat. No. 3,77,522 also describes a similar composition wherein the surfactant is an alkali or ammonium stearate. Wade, in U.S. Pat. No. 3,715,247 describes a small-diameter cap-sensitive emulsion type explosive composition comprising carbonaceous fuel, water, inorganic salts, an emulsifier, gas bubbles, and a detonation catalyst consisting of water-soluble salt containing selected metals. In U.S. Pat. No. 3,765,964, Wade describes an improvement in the composition of U.S. Pat. No. 3,715,247 by including therein a water-soluble strontium compound to provide further sensitivity. Wade again, in U.S. Pat. No. 4,110,134, describes an emulsion type explosive composition devoid of any self explosive ingredient and containing a closed-cell void-containing material as a density controller. Wade further describes, in U.S. Pat. No, 4,149,916, a cap sensitive emulsion type explosive composition containing perchlorates and occluded air and in U.S. Pat. No. 4,149,917, he describes a similar composition without any sensitizer other than occluded air. Sudweeks and Jessop in U.S. Pat. No. 4,141,767, describe a cap-insensitive water-in-oil emulsion explosive composition containing a fatty acid amine or ammonium salt surfactant having a chain length ranging from 14 to 22 carbon atoms. In Canadian Pat. No. 1,096,173, there is described a sensitive emulsion type explosive composition containing fuel, water, salts, gas bubbles, an emulsifier and an emulsification promoter comprising a highly chlorinated paraffinic hydrocarbon. Clay, in U.S. Pat. No. 4,111,727, describes a blasting composition consisting of a greasy, water-in-oil emulsion admixed with a substantially undissolved particulate solid oxidizer salt constituent so as to fill the interstices between salt particles to increase the bulk density of the mass. Similar blasting compositions had also been disclosed by Egly and Neckar in U.S. Pat. No. 3,161,551 and by Butterworth in South African Pat. Specification No. 71/3355.

The compositions of Wade, and other prior art water-in-oil emulsion-based explosives exhibit limited stability. These compositions tend to break down when exposed to shear conditions within a pump or to become dry and hard upon aging which conditions deleteriously affects their handling characteristics and their explosive performance. The surfactants used heretofore have not been sufficiently effective in permanently suppressing the coalescence of the supersaturated oxidizer salt droplets. Fairly large quantities of perchlorate salts on other sensitizing agents often must be incorporated in the mixtures in order to retain cap-sensitivity at densities above 1.10 g/cc for any appreciable period of time. Any of the composition containing added excess salts would exhibit very limited stability because of the seeding or precipitation effect of the salt crystals leading to a fairly rapid breakdown of the emulsion.

The effectiveness of emulsification of the aqueous salts and liquid fuels as a promoter of explosive performance is crucially dependent on the activity of the surfactant chosen. The surfactant aids the process of droplets subdivision and dispersion in the continuous phase by reducing the surface tension and the energy required to create new surfaces. The surfactant also reduces the rate of coalescence by coating the surface of the droplets with a molecular layer of material. The surfactants employed in the aforementioned prior art explosive compositions are somewhat effective in performing these function but they are limited in their utility because coalescence of the droplets and breakdown of the emulsion takes place under shear conditions and over time.

Proposals have been made to improve the stability of water-in-oil emulsion explosives by employing particular surfactants which function to a high level of efficiency in the harsh environment of an oxidizer salt solution. In U.S. Pat. No. 4,357,184 (Binet et al), it is disclosed that a combination of a conventional surfactant and an amphiphatic synthetic polymeric surfactant will lead to enhanced explosives stability. In United Kingdom Pat. Specification No. 2,156,799A, the use is proposed of a surfactant comprising a compound which contains a polyalk(en)yl succinic anhydride residue hydrophobic component. In U.S Pat. No. 4,708,753, an explosive emulsion is claimed wherein the surfactant is a salt derived from a substituted carboxylic acid and an amine. In published South African Specification No. 87/8540, an explosive emulsion is claimed in which the surfactant is derived from a carboxylic acylating agent, a polyamine and an acid. In U.S. Pat. No. 4,784,706 the emulsifier is a derivatized polybutyl or polypropyl phenol.

SUMMARY OF THE INVENTION

The water-in-oil explosive compositions of the invention comprise essentially an aqueous solution of at least one oxygen-supplying salt as a discontinuous phase, an insoluble liquid or liquefiable carbonaceous fuel as a continuous phase, an emulsifier, and, at point of use, a sensitizing component distributed substantially homogeneously throughout the composition as a further discontinuous phase, and wherein the emulsifier comprises surfactant material which is the product obtained by the reaction of polyalk(en)yl succinic anhydride, for example polyisobutylene substituted succinic anhydride (PIBSA), with an adduct of the general formula:

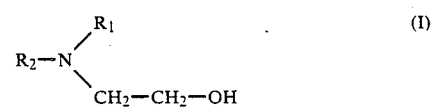

where:, $R_1$ =H or —CH2—CH2—OH
and $R_2$ is selected from the group consisting of an acyl group containing 8–20 carbon atoms, and a hydroxy ethyl ester of a long-chain mono-or di-carboxylic acid containing from 8–25 carbon atoms.

In a broader aspect the invention provides a water-in-oil emulsion explosive in which the emulsifier comprises a surfactant composition of formula:

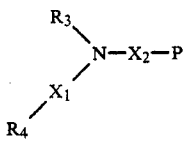

wherein:

N is nitrogen,
$R_3$ is H or hydroxyethyl ($-CH_2.CH_2.OH$),
$R_4$ is alk(en)yl with 8 to 20 backbone carbon atoms,
P is polyalk(en)yl with a high molecular weight eg a number average molecular weight of from 500 to 1500, and
X represents covalent bond, or a linking group selected from acyl

(N)-ethyloxyphenyl, or an acyl group of a lower ($\leq 6$ carbon atoms) mono-or di-carboxylic acid which is joined to the N atom either directly or through a $-CH_2.CH_2.O-$ester link;
and X, and $X_2$ may be the same or different, and the sum of acyl, ester and ethyl oxy groups present in the portion of the the molecule between $R_4$ and is at least 2.

The invention further includes such surfactant compositions as new useful materials.

The alk(en)yl chain of $R_4$ may have side-chain substituents of insubstantial bulk, for example methyl groups as are present when $R_4$ is obtained by olefine polymerisation.

Without intending to limit the scope of the invention herein described and claimed, the optimum carbon chain length of $R_2/R_4$ may be approximately determined by selecting a carbon chain length for $R_2/R_4$ which, when added to the average number of carbon atoms in the fuel phase of the emulsion, is equal to the average number of carbon atoms in the polyalk(en)yl chain.

The novel surfactants of the invention are characterised by their superior stability under conditions of shear, as found in pumping and packaging operations, and under conditions of shock which occur in transportation and handling.

Prior art surfactants, such as sorbitan oleates, while providing emulsions of good shear stability, tend to provide emulsions of limited shelf-life. Conversely, prior art surfactants based on PIBSA provide emulsions with excellent shelf-life but greatly limited resistance to shear. It is postulated that this lack of resistance to shear is due to the relatively high molecular surface area occupied by the surfactants of this class at the oil/oxidizer solution interface. Similarly, the viscosity of water-in-oil emulsions made from PIBSA surfactants tends to be relatively low because of the often poorer emulsifying ability of these materials. It might, therefore, be logically expected that any addition of extra chains or groups to the already bulky PIBSA-based surfactants would only further increase the molecular surface area occupied at the interface and so further reduce their utility. It is, therefore, surprising, indeed, that the addition of hydrocarbon chains at the $R_2/R_4$ position substantially improves the properties of these surfactants and leads to improved explosive products which demonstrate greater shear and shock resistance.

The proportion of surfactant which is required in a particular water-in-oil explosive system may vary widely according to the nature of the two phases, but in most instances, it will lie in the range 0.1% to 25% by weight, of the final emulsion. These new surfactants may be the only emulsifiers used or they may be supplemented by other water-in-oil emulsifiers such as sorbitan oleates which are known to be good emulsifiers for forming explosive emulsions.

A way in which one class of surfactants of the present invention may be made is by reacting the anhydride directly with an alk(en)yl substituted amide which has in the molecule at least one ethanol grouping attached to the amide nitrogen. The anhydride group reacts readily with such compounds containing a hydroxyl group to form a derivative which is covalently bonded through an ester linkage. Examples of such compounds, where the ethanol grouping which is to be present in the hydrophilic component of the surfactant is attached to the amide nitrogen, include the mono- or di-ethanol derivative of the alk(en)yl amides. Another way in which such surfactants may be produced is by an indirect, two-stage process in which an amide (wherein the alk(en)yl group is attached to the amide carbonyl) is reacted with an amino ethanol in order to produce the mono- or di-ethanol derivative of the preferred linking compound containing one reactive group such as hydroxyl. The intermediate adduct product so obtained is then reacted with polyalk(en)yl succinic anhydride.

Because of the acidic nature of the amide nitrogen, the ethanol derivatives of the alk(en)yl substituted amide intermediate adduct combines with the polyalk(en)yl succinic anhydride to form esters.

In preparing the linking compounds, the reaction of the alk(en)yl substituted amide and ethanol amine, or the reaction of mono ethanol amine derivative of alk(en)yl substituted amide and ethanol amine, as the case may be, is, preferably, carried out by combining equimolar quantities of the reactants at a temperature in the range 50°-80° C.

Some of the mono-or di-ethanol derivative of the alk(en)yl substituted amides, useful in preparing the ester derivatives are objects of commerce.

Alternatively, the mono- or di-ethanol derivative of the alk(en)yl substituted amide useful in the invention can be prepared by conventional chemical means, eg, a process in which an acylating agent is reacted with an amino alcohol which has in the molecule at least two and maximum three ethanol groupings, and produces the preferred linking compound that combines with, for example, the polyalk(en)yl succinic anhydride to form the surfactants of the present invention. The acylating agent is an aliphatic mono- or poly-carboxylic acid, and, more preferably, a dicarboxylic acid. The carboxylic acylating agent may also be an aromatic mono-or poly-carboxylic acid or acid producing compound. The acylating agents include alk(en)yl-substituted derivatives, and the alk(en)yl groups may contain up to about 20 carbon atoms and may of course have been derived by polymerisation of a $C_2-C_4$ olefin. Specific examples of alk(en)yl dicarboxylic acids and acid producing compounds useful as acylating agents include alk(en)yl succinic anhydrides or succinic acids wherein the alk(en)yl group contains 8-20 carbon atoms. These acylating agents are then reacted with an amino alcohol which can be di-ethanol or tri-ethanol amine. In the case of the preparation of such linking compounds, the acylating agent and the amine are used in approximately stoichiometric proportions to each other so that a half derivative of the alk(en)yl succinic acid containing a free carboxyl group will be formed thereby. The linking compound so formed is mainly an ester, which may contain amide when secondary amines or mixtures are employed.

In preparing the linking compound, the reaction of the alk(en)yl substituted succinic anhydride with the amino alcohol containing two or three ethanol groupings, as the case may be, is preferably carried out by combining equimolar quantities of the reactants at a temperature in the range 5020 -80° C.

The reaction of polyalk(en)yl succinic anhydride (eg polyisobutyl or propyl succinic anhydride) with the linking compound is carried out under mild conditions. The two reactants may be heated together at a temperature in the range 70°-100° C. optionally in the presence of an inert non-polar diluent such as paraffin oil or xylene respectively. In the case of the direct or indirect route, polyalk(en)yl succinic anhydride and the linking compound are used in approximately molar equivalence so that a half ester derivative of the polyalk(en)yl succinic anhydride, containing a free, carboxyl group derived from the ring opening of the anhydride ring is formed thereby. It has been found that 3 hours of heating at 80°-90° C. for the completion of the esterifiction reaction between polyalk(en)yl succinic anhydride and the linking compounds is usually adequate. The polyalk(en)yl group may suitably have a number average molecular weight in the range 500 to 1500 g/mole. The polyalk(en)yl group is very conveniently polyisobutyl.

The following Examples describe the manufacture of the novel surfactants employed in the water-in-oil emulsions of the present invention.

EXAMPLE 1

167 Gms of commercially available polyisobutylene substituted succinic anhydride diluted in a paraffin oil medium was heated to a temperature in the range of 80°-90° C. 23.5 Gms of Coco-monoethanol amide was then added to the anhydride with constant stirring. After completion of the addition of Coco-monoethanol amide, the resulting mixture was further diluted by 56.5 gms of paraffin oil, and the mixture was kept at the same temperature for 3 hours. The surfactant produced, as a 50% m/m solution in paraffin oil, is shown as surfactant No. 7 in Table I, below. The Coco chain is predominantly mixed linear $C_{12}$ and $C_{14}$ alkyl but contains about 15% of linear $C_8/C_{10}$ alkyl and about 15% linear $C_{16}/C_{18}$ alk(en)yl.

EXAMPLE 2

167 Gms of commercially available polyisobutylene substituted succinic anhydride diluted in a paraffin oil medium was heated to a temperature in the range of 80°-90° C. 28.0 Grams of Coco-diethanol amide was then added dropwise to the anhydride with constant stirring. After completion of the addition of Coco-diethanol amide, the resulting mixture was further diluted by paraffin oil by adding 61.0 gms of it and the mixture was kept at the same temperature for 3 hours. The surfactant produced, as a 50% m/m solution in paraffin oil, is shown as Surfactant no. 8 in Table I, below.

All the surfactants 9 to 18 shown in Table 1 and below were produced in the manner described in Examples 1 and 2 except that the weight of additive employed was varied according to its nominal formula weight.

The synthesis of the surfactants 9 to 18 shown in Table I involve the steps of:

(a) esterifiction reaction between n-alkyl succinic anhydride and di- or tri-ethanol amine

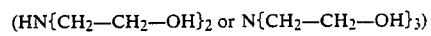

These reactions are carried out at 60° C. to facilitate the formation of the esters and the formation of the product is monitored by Infrared Spectroscopy. The general formula of these products, which are used as intermediates or adducts for the subsequent reaction with PIBSA, can be written as:

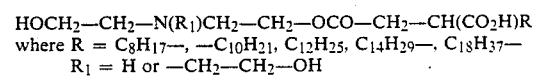

and (b) esterifiction reaction between PIBSA and the adducts.

EXAMPLE 3

29.6 Gms of tetradecyl succinic anhydride was heated to a temperature in the range of 60-65 ° C. 10.5 Gms of diethanol amine was added dropwise to the anhydride with constant stirring. Completion of reaction and formation of esters was noted by Infrared Spectroscopy by the disappearance of the absorbance peak at 1790 ch$^{-1}$ due to anhydrides and appearance of the ester peak at 1740 ch$^{-1}$. Further reaction between PIBSA and the adduct was carried out by using all of the above reactions product together with 167 gms of PIBSA. The surfactant produced, as a 50% w/w solution in paraffin oil, is shown as Surfactant No. 12 in Table I, below.

EXAMPLE 4

26.8 Gms of dodecyl succinic anhydride was heated to a temperature in the range of 60°-65° C. 14.9 Gms of triethanol amine was added dropwise to the anhydride with constant stirring. Completion of reaction and formation of esters was noted by the same way as described in Example 3. Further reaction between PIBSA and the adduct was carried out by using all of the above reaction product together with 167 gms of PIBSA. The surfactant produced, as a 50% w/ solution in paraffin oil, is shown as Surfactant No. 16 in Table I, below.

All the surfactants 9 to 18 shown in Table I below were produced in the manner described in Examples 3 and 4 except that the weight of the adduct employed was varied according to the nominal formula weights.

EXAMPLE 5

A series of water-in-oil emulsion explosive compositions were made up according to the following formulation:

| Aqueous phase | Ammonium Nitrate | 70.57% m/m |
|---|---|---|
| | Sodium Nitrate | 10.07 |
| | Water | 11.00 |
| Fuel Phase | Slackwax | 2.00 |

|  |  |  |
|---|---|---|
|  | Paraffin Oil | 2.48 |
| Sensitizer | Glass Microballoons | 2.91 |
| Surfactant (as active ingredient) | As shown in Table I | 0.97 |

The emulsion was made by:
(a) mixing the water and inorganic oxidizer salts in a first premix;
(b) mixing the carbonaceous fuel and surfactant in a second premix; and
(c) adding the first premix to the second premix in a suitable mixing apparatus to form a water-in-oil emulsion.

In step (b), the surfactant may first be combined with a small amount of fuel before mixing with the balance of the fuel.

The first premix was heated until all the salts were completely dissolved and the solution was filtered in order to remove any insoluble residue. The second premix was also heated to liquefy the ingredients. Any type of apparatus capable of either low or high shear mixing can be used to prepare the emulsion explosives. Glass microspheres were added to the emulsion and simply blended until homogeneously dispersed throughout the composition. The emulsion explosives were packaged in plastic tubing to form a 20 cm long cartridge in a diameter of 25 mm. The various emulsion explosives were examined for molecular surface area, droplet size, rise in shear temperature, viscosity and sensitivity to initiation. The results are recorded in Table I and the molecular surface are was determined as outlined in the footnote to Table I.

TABLE I

| Surfactant | $R_1$ | $R_2$ | Mol. Surface Area (Angstrom [2]) | Average Droplet Size (μm) | Viscosity [1] |
|---|---|---|---|---|---|
| 1 | H | H | 96 | 3.0 | $1.80 \times 10^5$ cps |
| 2 | $CH_2CH_2OH$ | H | 108 | 3.0 | $1.80 \times 10^5$ cps |
| 3 | H | $CH_3CO-$ | 92 | 3.5 | — |
| 4 | $CH_2CH_2OH$ | $CH_3CO-$ | 107 | 3.2 | $1.90 \times 10^5$ cps |
| 5 | H | $C_3H_7CO-$ | 113 | 4.0 | — |
| 6 | $CH_2CH_2OH$ | $C_3H_7CO-$ | 120 | 4.2 | — |
| 7 | H | $Coco.CO-$ | 84 | 2.4 | — |
| 8 | $CH_2CH_2OH$ | $Coco.CO-$ | 67 | 1.9 | $2.40 \times 10^5$ cps |
| 9 | H | $C_8H_{17}CHCH_2CO_2-CH_2CH_2-$ <br>        \|<br>     COOH | 110 |  |  |
| 10 | H | $C_{10}H_{21}CH-CH_2-CO_2CH_2CH_2-$ <br>       \|<br>     COOH | 95 |  |  |
| 11 | H | $C_{12}H_{25}CH-CH_2-CO_2CH_2CH_2-$ <br>       \|<br>     COOH | 88 |  |  |
| 12 | H | $C_{14}H_{29}CH-CH_2-CO_2CH_2CH_2-$ <br>       \|<br>     COOH | 78 | 2.5 |  |
| 13 | H | $C_{18}H_{37}CH-CH_2-CO_2CH_2CH_2-$ <br>       \|<br>     COOH | 94 |  |  |
| 14 | $CH_2CH_2OH$ | $C_8H_{17}CH-CH_2CO_2CH_2CH_2-$ <br>       \|<br>     COOH | 74 |  |  |
| 15 | $CH_2CH_2OH$ | $C_{10}H_{21}CH-CH_2CO_2CH_2CH_2-$ <br>       \|<br>     COOH | 63 |  |  |
| 16 | $CH_2CH_2OH$ | $C_{12}H_{25}CH-CH_2CO_2CH_2CH_2-$ <br>       \|<br>     COOH | 54 |  |  |
| 17 | $CH_2CH_2OH$ | $C_{14}H_{29}CH-CH_2-CO_2-CH_2-CH_2-$ <br>       \|<br>     COOH | 46 | 2.0 |  |
| 18 | $CH_2CH_2OH$ | $C_{18}H_{37}CH-CH_2-CO_2-CH_2-CH_2-$ <br>       \|<br>     COOH | 78 | 27 |  |

| Surfactant | Viscosity [2] | Minimum initiator | Velocity of Detonation (Km/sec.) | Rise in Shear Temp. (°C.) |
|---|---|---|---|---|
| 1 | $1.46 \times 10^4$ cps | R-7 | 4221 | 28 |
| 2 | $1.72 \times 10^4$ cps | R-6 | 4385 | 30 |
| 3 |  | EB | 3516 | 28 |
| 4 | $1.68 \times 10^4$ cps | R-13 | 3448 | 20 |

TABLE I-continued

| | | | | |
|---|---|---|---|---|
| 5 | " | EB | 3680 | 28 |
| 6 | " | R-7 | 3897 | 20 |
| 7 | " | R-7 | 4341 | 30 |
| 8 | 1.86 × 10⁴ cps | R-6 | 4330 | 14 |
| 9 | | R-6 | 4291 | 11 |
| 10 | | R-6 | 4320 | 10 |
| 11 | | R-6 | 4536 | 9 |
| 12 | | R-6 | 4454 | 16 |
| 13 | | R-6 | 4410 | 33 |
| 14 | | R-6 | 4885 | 15 |
| 15 | | R-6 | 4568 | 14 |
| 16 | | R-6 | 4472 | 85 |
| 17 | | R-6 | 4601 | 16 |
| 18 | | R-6 | 4458 | 27 |

FOOTNOTES TO TABLE I

Molecular Surface Area

Molecular surface area was determined from the slope of the plot of interfacial tension versus logarithm of concentration of the surfactant at an oil/water interface. These measurements were made with a Du Nuoy tensionmeter in the conventional manner.

Average Droplet Size

Droplet sizes were determined by analyzing the micrographs of emulsions obtained from a phase contrast microscope. The magnification of all finished photomicrographs was the same and the diameters of all droplets were measured in micrometer or micron.

ΔT

The rise in shear temperature (ΔT) of emulsion was measured by the "Rolling Pin Test" which consists of a roller which passes on a fixed track, a platform of variable height on which is placed a cartridge of the explosive to be tested and a thermocouple temperature probe and readout. The passage of the roller imparts shear by flattening the cartridge to the specified clearance and the temperature rise in then recorded. This test was performed with the cap-sensitive packaged formulation. Initial temperature of the samples was kept at −17° C. in all cases. After performing the test the net rise in temperature was recorded over 20–30 sec. as ΔT.

Viscosity (1)

For the laboratory evaluation, the emulsions were made in 3 kg Hobart mixer and the viscosity was determined by Brookfield viscometer with spindle No. 7 at 10 rpm under ambient condition.

Viscosity (2)

These emulsions were made by the apparatus described in copending UK Pat. Specification No. 8729444 and the viscosity was determined by Brookfield viscometer with spindle No. 7 at 50 rpm under ambient condition.

Minimum Initiator

** Caps designed R-n contain 0.1 g initiating composition and$((n-3) \times 0.05$ g PETN $13 \geq n \geq 4$ or $(n-13) \times 0.1 + 0.5$ g PETN $16 \geq n \geq 14$ base charge. E.B. indicates electric blasting caps containing 0.08 g initiating composition and 0.78 g PETN. All properties were measured at 5° C.

In Table I, Examples 1 to 6 are comparative. Examples 13 and 18 are marginal in terms of explosive emulsion properties since the fuel phase used in all Examples comprised longer chain paraffins. By contract, Examples 11 and 16, which demonstrate particularly low rise in shear temperature, make use of surfactants wherein the shorter carbon chain length of R2, when added to the average number of fuel carbon atoms, substantially matches the average number of carbon atoms in the polyisobutylene chain.

The preferred inorganic oxygen-supplying salt suitable for use in the aqueous phase of the water-in-oil emulsion composition is ammonium nitrate; however, a portion of the ammonium nitrate may be replaced by other oxygen-supplying salts such as alkali or alkaline earth metal nitrates, chlorates, perchlorates or mixtures thereof. The quantity of oxygen-supplying salt used in the aqueous phase may range from 30% to 90% by weight of the total composition, the aqueous phase, itself, comprising up to 95% or more of the total composition.

Suitable water-immiscible emulsifiable fuels for use in the water-in-oil emulsion include most hydrocarbons, for example, paraffinic, olefinic, naphthenic, elastomeric, aromatic, saturated or unsaturated hydrocarbons. Preferred among the water-immiscible emulsifiable fuels are the highly refined paraffinic hydrocarbons. The quantity of liquid or liquefiable carbonaceous fuel used in the water-in-oil emulsion may comprise from about 0.5% to 20% by weight of the total composition.

The sensitizing component distributed substantially homogeneously throughout the composition is preferably occluded gas bubbles which may be introduced in the form of glass or resin microspheres or other gas-containing particulate materials. Alternatively, gas bubbles may be generated in-situ by adding to the composition and distributing therein a gas-generating material such as, for example, an aqueous solution of sodium nitrite. Other suitable sensitizing components which may be employed alone or in addition to the occluded or in-situ generated gas bubbles include insoluble particulate solid self-explosives such as, for example, grained or flaked TNT, DNT, RDX and the like and water soluble and/or hydrocarbon soluble organic sensitizers such as, for example, amine nitrates, alkanolamine nitrates, hydroxyalkyl nitrates, and the like. The explosive compositions of the present invention may be formulated for a wide range of applications. Any combination of sensitizing components may be selected in order to provide an explosive composition of virtually any desired density, weight-strength or critical diameter.

The quantity of solid self-explosive ingredients and of water-soluble and/or hydrocarbon-soluble organic sensitizers may comprise up to 40% by weight of the total composition. The volume of the occluded gas composition may comprise up to 50% of the volume of the total explosive composition.

Optional additional materials may be incorporated in the composition of the invention in order to further improve sensitivity, density, strength, rheology and cost of the final explosive. Typical of materials found useful as optional additives include, for example emulsion promotion agents such as highly chlorinated paraffinic hydrocarbons, particulate oxygen-supplying salts such as prilled ammonium nitrate, calcium nitrate, perchlorates, and the like, ammonium nitrate/fuel oil mixtures (ANFO), particulate metal fuels such as aluminium, silicon and the like, particulate non-metal fuels such as sulphur, gilsonite and the like, particulate inert materials such as sodium chloride, barium sulphate and the like, water phase or hydrocarbon phase thickeners such as guar gum, polyacrylamide, carboxymethy or ethyl cellulose, biopolymers, starches, elastomeric materials, and the like, crosslinkers for the thickeners such as potassium pyroantimonate and the like, buffers or pH controllers such as sodium borate, zinc nitrate and the like, crystals habit modifiers such as alkyl naphthalene sodium sulphonate and the like, liquid phase extenders such as formamide, ethylene glycol and the like and bulking agents and additives of common use in the explosives art.

The quantities of optional additional materials used may comprise up to 50% by weight of the total explosive composition, the actual quantities employed depending upon their nature and function.

As noted heretofore, the preferred methods for making the water-in-oil emulsion explosive compositions of the invention comprise the steps of:

(a) mixing the water, inorganic oxidizers salts and, in certain cases, some of the optional water-soluble compounds, in a first premix;

(b) mixing the carbonaceous fuel, surfactant and any other optional oil soluble compounds, in a second premix; and (c) adding the first premix to the second premix in a suitable mixing apparatus, to form a water-in-oil emulsion.

The first premix is heated until all the salts are completely dissolved and the solution may be filtered if needed in order to remove any insoluble residue. The second premix is heated when it is necessary to liquefy the ingredients. In making the second premix, the surfactant may first be combined with a small amount of the fuel before addition to the balance of the fuel. Any type of apparatus capable of either low or high shear mixing can be used to prepare the emulsion explosives of the invention. Glass microspheres, solid self-explosive ingredients such as particulate TNT, solid fuels such as aluminium or sulphur, inert materials such as barytes or sodium chloride, undissolved solid oxidizer slats and other optional materials, if employed, are added to the emulsion and simply blended until homogeneously dispersed throughout the composition.

The water-in-oil emulsion of the invention can also be prepared by adding the second premix liquefied fuel solution phase to the first premix hot aqueous solution phase with sufficient stirring to invert the phases. However, this method usually requires substantially more energy to obtain the desired dispersion than does the preferred reverse procedure. Alternatively, the water-in-oil emulsion is particularly adaptable to preparation by a continuous mixing process where the two separately prepared liquid phases are pumped through a mixing device wherein they are combined and emulsified.

I claim:

1. A water-in-oil explosive emulsion comprising a continuous oil phase, a discontinuous aqueous phase, and a minor amount of emulsifier, wherein the emulsifier comprises a surfactant which is the reaction product formed by the esterification of polyalk(en)yl succinic anhydride by an adduct of the formula:

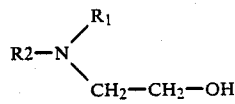

where $R_1$ is H or $-CH_2-CH_2-OH$ and $R_2$ is selected from the group consisting of an alk(en)yl or acyl group containing 8–20 carbon atoms in the backbone of the hydrocarbyl chain and a hydroxy ethyl ester of a mono- or di-carboxylic acid containing from 8–20 carbon atoms in the hydrocarbyl chain (aside from any pendant methyl groups) and not more than 6 atoms in the remaining link to the N atom.

2. An explosive emulsion as claimed in claim 1 wherein the said oil phase is present in an amount of from 0.5% to 20% by weight of said emulsion.

3. An explosive emulsion as claimed in claim 1 wherein the said aqueous phase is present in an amount up to 96% by weight of the said emulsion.

4. An explosive emulsion as claimed in claim 1 wherein the said surfactant is present in an amount of from 0.1% to 25% by weight of the said emulsion.

5. An explosive emulsion as claimed in claim 1 wherein $R_2$ is selected from the group

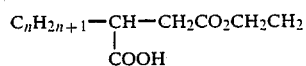

and $C_nH_{2n+1}-CO$ where n is an interger from 8 to 20, preferably 8 to about 14.

6. An explosive emulsion as claimed in claim 5 wherein $R_2$ includes mixed even carbon numbered alk(en)yl groups derived from naturally occurring oils and fats.

7. A water-in-oil emulsion explosive in which the emulsifier comprises a surfactant composition of formula:

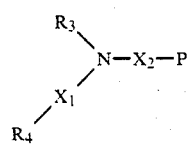

wherein:

N is nitrogen, $R_3$ is H or hydroxyethyl (—$CH_2.CH_2.OH$)

$R_4$ is alk(en)yl with 8 to 20 backbone carbon atoms.

P is polyalk(en)yl with a number average molecular weight of from 500 to 1500, and X represents a covalent bond, or a linking group selected from acyl

, (N)-ethyloxy, (N)-ethyloxyphenyl, or an acyl group of a lower (≦6 carbon atoms) mono- or di-carboxylic acid which is joined to the N atom either directly or through a —$CH_2.CH_2.O$— ester link;

and X, and $X_2$ may be the same or different, and the sum of acyl, ester and ethyl oxy groups present in the portion of the molecule between $R_4$ and P is at least 2.

* * * * *